No. 752,886. PATENTED FEB. 23, 1904.
N. W. CRANDALL.
KNOB SHANK FILLING.
APPLICATION FILED OCT. 17, 1903.
NO MODEL.

Witnesses
Geo. V. Rasmussen

Inventor
Nathan W. Crandall
By his Attorney

No. 752,886. Patented February 23, 1904.

UNITED STATES PATENT OFFICE.

NATHAN W. CRANDALL, OF MERIDEN, CONNECTICUT, ASSIGNOR TO THE RUSSELL & ERWIN MFG. COMPANY, OF NEW BRITAIN, CONNECTICUT, A CORPORATION OF CONNECTICUT.

KNOB-SHANK FILLING.

SPECIFICATION forming part of Letters Patent No. 752,886, dated February 23, 1904.

Application filed October 17, 1903. Serial No. 177,369. (No model.)

*To all whom it may concern:*

Be it known that I, NATHAN W. CRANDALL, a citizen of the United States, residing at Meriden, in the county of New Haven, State of Connecticut, have invented certain new and useful Improvements in Knob-Shank Fillings, of which the following is a full, clear, and exact description.

My invention relates to improvements in knobs, and particularly to a construction for filling the shank of a hollow knob in order to provide a foundation for securing the knob to the spindle.

This invention is particularly useful in the manufacture of sheet-metal knobs for doors and similar constructions.

The object of the invention is to provide a means of strengthening and supporting a knob-shell in such a manner that the manufacture may be economical and the resultant structure efficient and durable.

The filling in the past has been cast and then machined to properly adapt it to use.

Figure 1:
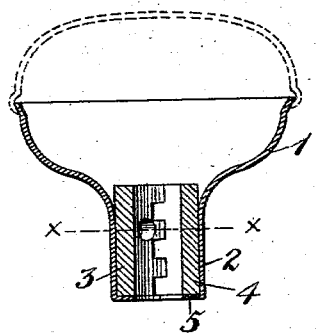
Figure 2:
Figure 3:
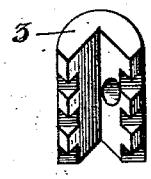
Figure 4:
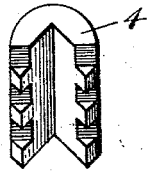
Figure 5:
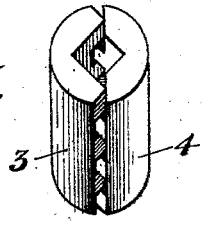

The invention consists in employing two companion pieces which are locked together and inserted in the hollow shank of a knob and secured in place therein In the drawings, Figure 1 is a longitudinal section of a portion of a knob with a filling of my invention. Fig. 2 is a cross-section on the plane of the line X X of Fig. 1. Fig. 3 is a perspective view showing one-half of the knob-shank filling. Fig. 4 is a similar view showing the other half. Fig. 5 is a perspective view showing the two halves combined in the same position as shown in cross-section, Fig. 1.

1 indicates a portion of the knob-shell, the outer half being shown dotted.

2 is the shank of the knob.

Knobs of this character are usually mounted on square spindles for use in door-locks, latches, and the like. In order that this knob may be securely fastened in place, it is quite necessary that the interior portion be strengthened to afford a sufficient support. This method of construction constitutes my invention.

3 is one member of the knob-shank filling, which has a series of teeth or alternate projections and recesses on the opposite edges, as shown particularly in Fig. 3. 4 is a companion member which has a series of recesses and teeth which correspond with the teeth and recesses of the member 3. The two parts when used together, as shown in Fig. 5, are locked by means of the engagement of corresponding alternate teeth and notches, so that neither of them can have independent movement. These members may be pressed or stamped from metal in a very economical manner, and thus provided with smooth and perfect bearing-surfaces without the necessity of finishing or machining. The filling may thus be made economically and yet to fit the part desired perfectly. One member or the other is provided with a perforation or hole through which the ordinary screw or pin for attaching the knob to the spindle passes. When the device is assembled in the knob-shank, it is in place therein, as shown in Fig. 1. One end of the knob-shank is shown affording an abutment or bearing and covering 5 for the filling members.

The metal of the shank is projected slightly around the edge of the hole or recess, as shown at 6. This affords an efficient and simple means of locking the member thus engaged in place in the shank. Both members are thus locked securely, the one directly by the projected metal from the shank and the other indirectly by its engagement with the first-mentioned member.

What I claim is—

1. A knob-shank filling comprising a pair of companion pieces having alternate projections and notches interlocking with one another along their adjacent longitudinal edges.

2. A knob construction comprising a metal shell, a pair of filling members having projections interlocking with one another, and means for securing said members in place in the shank of the shell.

3. A knob construction comprising a shell, a pair of filling members having alternate projections and notches interlocking with one another, one of said members having a perforation therethrough, the metal of the shell being pressed into and around the edge of said perforation for holding the member in place.

4. A knob construction comprising a sheet-metal shell, a pair of filling members having projections interlocking with one another, the metal of the shell being bent up to form a bearing and covering for one end of said members, one of said members having a perforation therethrough, the metal of the shell adjacent said perforation being indented to hold said member in place.

NATHAN W. CRANDALL.

Witnesses:
M. S. WIARD,
C. E. RUSSELL.